United States Patent [19]
Andersen et al.

[11] Patent Number: 5,159,580
[45] Date of Patent: Oct. 27, 1992

[54] ACOUSTIC TRANSDUCER FOR SENDING AND RECEIVING ACOUSTIC COMMUNICATION SIGNALS

[75] Inventors: James K. Andersen; John H. Thompson, both of Severna Park; James W. White, Arnold, all of Md.

[73] Assignee: Ocean Systems Research, Inc., Annapolis, Md.

[21] Appl. No.: 770,545

[22] Filed: Oct. 3, 1991

[51] Int. Cl.$^5$ ............................................. H04B 11/00
[52] U.S. Cl. .................................. 367/132; 367/134; 367/165
[58] Field of Search ............... 367/134, 132, 165, 173, 367/188; 381/169

[56] References Cited

U.S. PATENT DOCUMENTS

| | | | |
|---|---|---|---|
| 2,172,066 | 9/1939 | Logsdon et al. | 367/132 |
| 4,213,199 | 7/1980 | Labaw et al. | 367/134 |

Primary Examiner—Daniel T. Pihulic
Attorney, Agent, or Firm—Charles W. Helzer

[57] ABSTRACT

A uniquely designed acoustic transducer comprising a stack of piezoceramic elements (other piezoelectric materials may be used) mounted upon a tuned, shaped transmit/receive head made of hardened metal alloy. The ceramic stack is preloaded to the head via a stress bolt. Insulator electrodes used in the ceramic stack are selected to minimize compliance in the stack for maximum efficiency. All the material properties, sizes, weights, etc., as well as the overall transducer design are carefully selected to act in combination to match the impedance of the load (i.e. metal structural framework). The diameter of the tip of the tuned, shaped driving head is sized such that when clamped to a metal framework, the base metal of the material just under the tip is compressed to or slightly beyond its yield point. This eliminates the requirement for surface preparation because any coatings will be displaced under the applied pressure and any surface irregularities will be flattened out. The underside of the clamping member used to hold the transducer assembly in place consists of a half wave length reflecting waveguide designed to reflect any absorbed energy back into the load. Thus, the attachment points for both the reflector and the transducer head of the clamping device effectively appear invisible to the driving transducer under load.

12 Claims, 2 Drawing Sheets

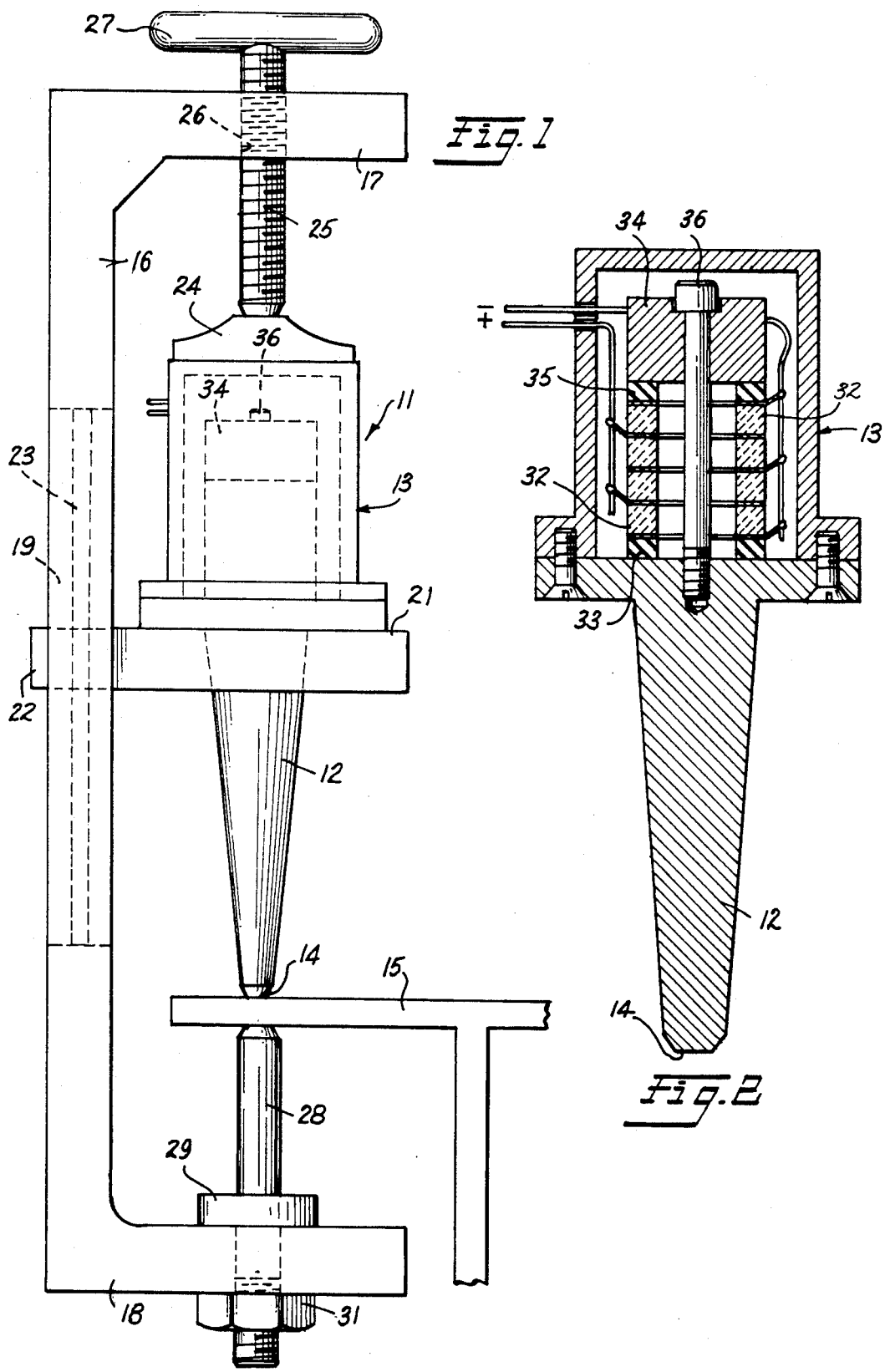

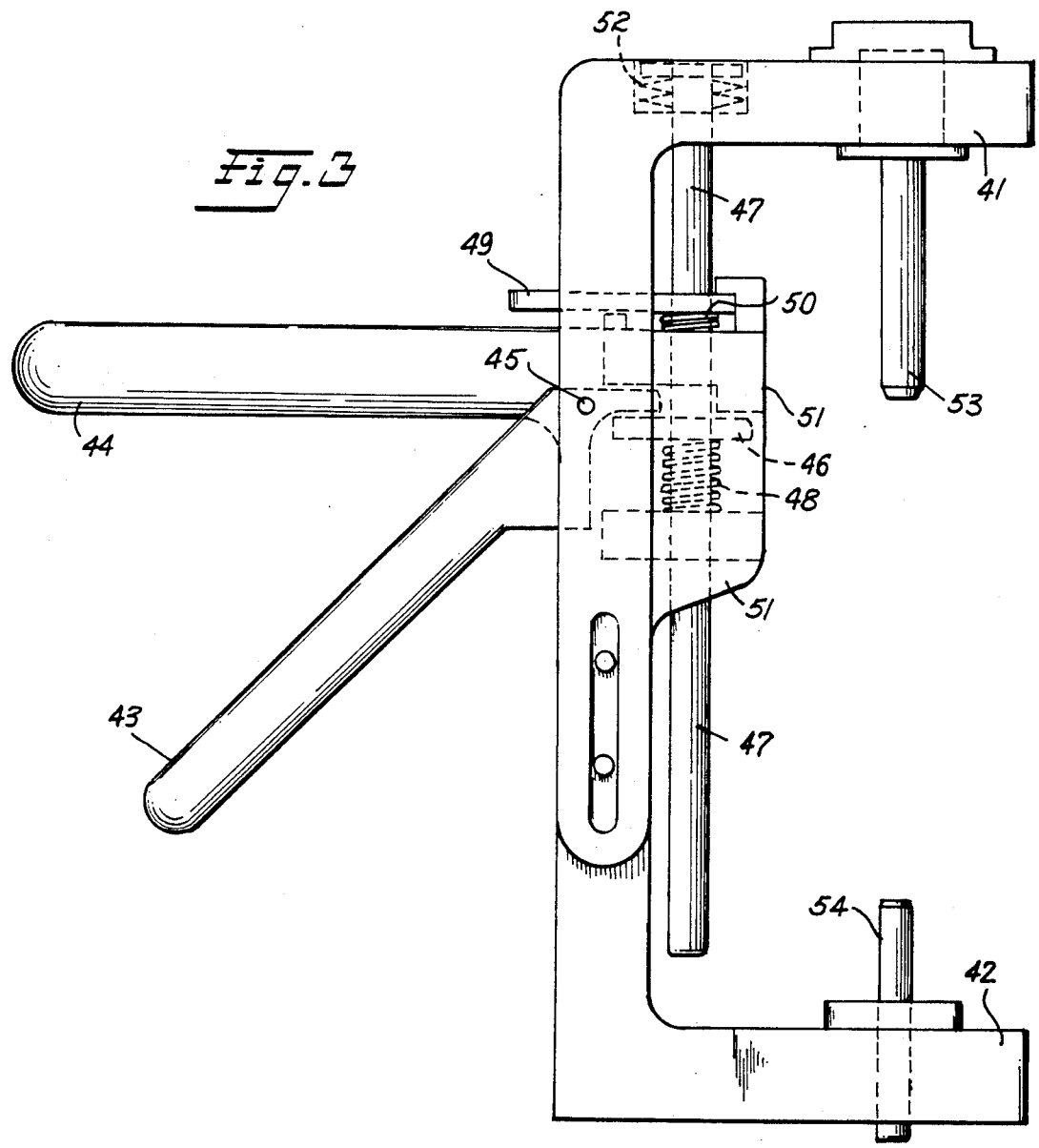

5,159,580

ACOUSTIC TRANSDUCER FOR SENDING AND RECEIVING ACOUSTIC COMMUNICATION SIGNALS

FIELD OF INVENTION

This invention relates to an improved portable acoustic transducer for sending and/or receiving acoustic communication signals through the framework of a ship, building, network of piping, rails or the like.

BACKGROUND PRIOR ART

Current methods of communication (voice or digital) typically rely upon either installed cables which may be either insulated electric cables of fiber optic cables, or the transmission of energy through the air (e.g. radio frequency, infrared). Installed cables and wires are expensive to install and maintain and are not considered dependable under fire or battle damage conditions. In addition, in such installed cable systems, the number and location of outlets are usually fixed and may not be located at a point where an emergency communication terminal is required on a ship or in a building. Communication via airwaves eliminates the need for installed cables, wires or fiber optic devices; however, such systems have their own set of problems. RF transmissions have difficulty penetrating steel bulkheads in the interior spaces of a ship or building. Also, the possibility of interference with other installed electronic equipment is high and RF transmissions may not be acceptable under certain emission control conditions. U.S. Pat. No. 2,172,066 to L. B. Logsdon - issued Sep. 5, 1939 and U.S. Pat. No. 4,213,199 to Kenneth B. Labaw - issued Jul. 15, 1980, both describe systems for providing an acoustic communications data link by transmitting acoustic energy through the metal framework of a ship of a building structure. Other communication systems employing acoustic energy have been proposed for transmitting the acoustic energy through the rails of a rail system or pipes of a network of piping used for water supply or other plumbing needs.

The above-noted prior art patents and prior acoustic energy signal transmission systems all acknowledge the fact that acoustic energy can be successfully transmitted through structural members. However, these prior art patents and systems do not address a most fundamental requirement of such systems, namely the specific design of the transducer which either puts acoustic energy into a metal structure or receives acoustic energy from the metal structure and converts it to an intelligible electrical signal. In the Labaw U.S. Pat. No. 4,213,199, it is simply stated that "a transducer which in turn is clamped or cemented to the metal frame" is employed to supply the acoustic energy to the metal framework of a ship or other structure which is being used to transmit the acoustic energy as intelligible signals. Thus, in these prior art disclosures, the specific design of a suitable acoustic transducer is not addressed. The development of a rapid and efficient portable means for coupling an acoustic transducer to the metal framework structure of a ship or building has been the major problem associated with the implementation of reliable acoustic information transmission system such as described in the Labaw U.S. Pat. No. 4,213,199 and Logsdon U.S. Pat. No. 2,172,066.

A typical structural member to which an acoustic transducer can be attached for shipboard applications is coated with several layers of paint and perhaps insulation. Previous acoustic transducer designs built and tested by the U.S. Navy required that the insulation be removed, the paint scraped off and the attachment surface sanded and polished to achieve satisfactory coupling of acoustic energy from the transducer to the structural member at a point desired. This "surface preparation" is a time consuming task, requires many tools and the quality of the coupling is highly dependent upon the skill of the operator/technician installing the system. In the case of fire or battle damage conditions, where the establishment of instant communication at a particular location within a ship or a building may be critical, such time consuming approach to the coupling problem is simply impractical.

A coupling of the acoustic transducer must not only be readily and rapidly accomplished, it also must be highly effective and efficient in operation. For fire fighting or shipboard damage control, the entire acoustic signal transducing device must be portable and lightweight such that an individual fire fighter, damage control man, rescue worker, etc., can easily carry the device to the scene of an accident where communications are to be established, without becoming unduly encumbered. Previous acoustic transducers used for communicating through steel structures such as the framework of ships, rails, piping systems, etc., were grossly ineffective and inefficient due to the combination of poor design and poor coupling. Many of the known prior art devices required the use of a relatively large battery pack as a source of electric power which alone weighed approximately one hundred pounds.

SUMMARY OF INVENTION

The invention comprises a uniquely designed portable acoustic transducer having a portable and readily attached mounting means in the form of a clamp for supporting a stack of piezoelectric elements contained within a transducer housing. The housing is mounted upon a specially designed transmit/receive head member that is directly coupled to the load to be driven, such as the framework of a ship or other building structure. The transmit/receive head member comprises a tuned, horn-shaped, or cylindrical member of hardened metal or metal alloy that terminates in a pointed tip end of small surface area. The piezoelectric elements in the stack contained within the transducer housing are preloaded relative to the transmit/receive head member by means of a stress bolt included within the housing assembly. Insulators and electrodes used in the piezoelectric stack, which preferably comprise piezoceramic elements, are selected to minimize compliance of the piezoelectric stack for maximum efficiency. All of the material properties, sizes, weights, and shape of the elements, as well as the overall transducer design are carefully selected to act in combination so as to match the impedance of the load to be driven (i.e. metal structural framework of a ship or other building). The diameter of the tip of the tuned head member is sized such that when clamped to the metal framework, the base metal of the material of the framework just under the tip is compressed to or slightly beyond its yield point. This eliminates any requirement for surface preparation because any coatings, paint, insulation, etc. will be displaced under the applied pressure and any surface irregularities will be flattened out. The underside of the clamping member which serves to mount the acoustic transducer in place on the framework of a ship or other building, is designed so as to comprise a half wave length reflecting waveguide designed to reflect any absorbed energy back into the load. By this design, the attachment points for both the reflector element and the transducer transmit/receive head to the clamping device appear "invisible" to the driving transducer under load.

BRIEF DESCRIPTION OF DRAWINGS

These and other objects, features and many of the attendant advantages of this invention will be appreciated more readily as the same becomes better understood from a reading of the following detailed description when considered in connection with the accompanying drawings wherein like parts in each of the several figures are identified by the same reference character, and wherein:

FIG. 1 is a elevational side view of a novel acoustic transducer according to the invention showing it mounted in place on the framework of a ship or other building;

FIG. 2 is a longitudinal sectional view of the acoustic transducer taken through the transmit/receive head member and intercoupled piezoelectric drive member mechanically supported by the transmit/receive head member; and FIG. 3 is a plan, elevational view of an alternative, one-handed clamping device for readily clamping the acoustic transducer to the framework of a ship or otherwise while using only one hand to operate the clamp.

BEST MODE OF PRACTICING INVENTION

FIG. 1 illustrates one embodiment of a portable acoustic transducer according to the invention. In FIG. 1, the portable acoustic transducer is shown generally at 11 and is comprised essentially of a transmit/receive head member 12 which is physically connected to and driven by/drives a stack of piezoelectric elements seated within a transducer housing 13 physically supported on the top of head member 12. The housing 13 and stack of piezoelectric elements are shown more fully in FIG. 2 of the drawings. The transducer transmit/receive head member 12 has a pointed tip end 14 which physically contacts and drives (or is driven by) the framework shown at 15 of a ship or other building structure element when the transducer is mounted in place. The transducer 11 is held in place on the framework 15 by mounting means comprised by a C-shaped clamp 16 having an upper leg 17 and a lower leg 18 projecting outwardly therefrom in the same direction. The C-shaped clamp 16, 17 and 18 is comprised of stainless steel or other suitable hardened metal and, in actuality, is formed by two complementary C-shaped members which are fastened together to form a slot 19 therebetween indicated by dotted lines.

A movable platform 21 formed of hardened plastic is designed to support the bottom of the transducer housing 13 with the transmit/receive head member 12 projecting through a hole through the center of the movable plastic platform 21. One side of the platform 21 includes an integral tongue portion 22 which is designed t ride within the slot 19 defined between the two, spaced apart mid portions of C-shaped clamping member 16. A set of spaced-apart, elongated, vertically extending rods 23 are set within the slot 19 parallel to one another and are frictionally engaged by small diameter openings in the tongue portion 22 of platform 21. By this means the platform 21 can be frictionally supported at a given position between the two legs 17 and 18. The frictional engagement of the platform tongue portion 22 with the rods 23 is such that the platform will retain the position of the tip of the horn 14 lined up with the tip of the reflector 28 under all expected load conditions.

The transducer housing 13 has a thickened top 24 formed by a leveling pad made from hardened steel which is engaged by the free end of a threaded compression rod 25. The threaded compression rod 25 is threadably supported within a threaded bore through the top leg portion 17 of the C-shaped clamp 16, 17 and 18. A suitable T handle shown at 27 is secured in the end of the threaded compression rod 25 for readily turning rod 25 inwardly or outwardly toward or away from housing 3. By turning the T-shaped handle 27 in a clockwise direction as viewed above the C-shaped clamp, the transducer housing 13 and appended transmit/receive head member 12 will be forced downwardly from the position set by the frictional holding rods 23 and into positive compression contact with a member such as 15 of the framework of a ship or other building structure.

On the underside of the C-shaped clamp a half wave length reflecting waveguide element 28 is fastened via adhesive bonding displacement node 29 of the reflector. The axial length of the rod 28 is designed such that it approximates one half wave length at the operating frequency at which the transducer 11 is driven.

The acoustic transducer according to the invention operates as follows. The user selects a beam in the metal framework of a ship or other building structure through which he desires to communicate. The user then places the clamp over web 15 of the selected beam in the manner shown in FIG. 1 and tightens the clamp by turning the threaded compression rod 25 in a direction to displace the tip end of transmit/receive head member 12 of the transducer downwardly into pressure engagement with the beam 15 of the ship's framework. The transmit/receive head member 12 is a tuned, horn-shaped member of hardened metal or a hardened metal alloy such as stainless steel terminating in a pointed tip end 14 of small surface area. The transmit/receive head 12 is designed to match the mechanical impedance of the load 15 at the desired operating frequency and thus can be described as being tuned. It preferably is fabricated from high strength (high hardness) stainless steel which is harder than any steel that might be used in the framework of a ship or other building structure with which the portable acoustic transducer might be used.

The diameter of the tip of the tuned, horn-shaped transmit/receive head member 12 is sized such that when it is clamped under pressure by twisting the T head 27 of compression rod 25 to increase the compression on frame member 15, the base metal of the material from which the frame member 15 is fabricated is compressed at or slightly beyond its yield point. This will result in rupturing any surface paint, insulation or other coating and eliminates the requirement for extensive surface preparation to assure good mechanical coupling of the transducer to framework 15. This is due to the fact that any surface coatings will be ruptured and displaced by tip 14 of the transmit/receive head 12 under the applied pressure and any surface irregularities will be flattened out and conform closely to the shape of the tip 14.

As noted earlier above, the underside 18 of the C-shaped clamp has a half wave length reflecting waveguide element 28 supported therein which serves in conjunction with the pointed tip 14 to compress the frame 15 therebetween and hence will back-up tip 14 and form a tight mechanical coupling of the transducer assembly with the frame member 15. Because of its selected length, the reflecting waveguide element will tend to reflect energy back into load 15. As a consequence, the attachment points for both the reflector and the transducer transmit/receive head member appear "invisible" to the transducer piezoelectric driving elements under load.

After the transducer assembly has been clamped in place in the above briefly-described manner, the transducer is energized by appropriate electronic circuitry (i.e. for either voice or digital data signals) and imparts acoustic vibrations into the metal frame member 15 which will be transmitted throughout the entire connected metal structure. Other similar transducers connected in a similar fashion to the metal framework at remote points from the location of the transducer assembly in question, can sense the acoustic vibrations and convert them back into electrical signals in a suitable form for presentation to the operator. While receiving incoming acoustic signals, the transmit/receive head member 12 is vibrated at an acoustic rate by the acoustic vibrations in the framework 15 from a remote location transmitter (not shown) and the piezoceramic cells in housing 13 convert the mechanical vibrations to an intelligible electric signal.

FIG. 2 is a longitudinal sectional view of the acoustic transducer sub-assembly comprised by the piezoelectric drive element housing 13 and transmit/receive drive member 12 separate from the C-shaped clamping member 16, 17 and 18 and reflective half wave length waveguide element 28. In FIG. 2 the preferred piezoelectric drive elements are shown at 32 and are comprised by annular-shaped piezoceramic drive discs 32. The annular discs 32 may comprise any known, commercially available piezoceramic material made by a number of manufacturers and sold commercially on the open market. The piezoceramic drive elements 32 preferably are annular, donut-shaped, flat discs which are stacked around a separate stress bolt 36 and separated by suitable electrodes. The electrodes are interconnected in sets to provide output electric signals from terminals marked + and − on housing 13. The stack of piezoceramic elements 32 is seated directly on the upper surface of the transmit/receive drive element 12 and is contained within the outer housing 13 with the bottom of an outer, annular flange on housing 13 being secured to an outer flange on the upper surface of drive member 12 by rivets or other suitable fasteners.

The lower end of the piezoceramic stack 32 is electrically isolated from the surface of drive member 12 by an insulator ring 33 and the upper end of stack 32 is electrically isolated from a tail mass 34 by an insulator ring 35. The tail mass 34 is secured to the top surface of the transmit/receive drive member 12 by means of a stress bolt 36 which is used to pre-stress the stack of piezoceramic elements 32 to a desired pre-stressed condition. This is done simply by turning the stress bolt 36 in a direction to place increased compression of the tail mass 34 on the stack of piezoceramics.

The insulators and electrodes used in the ceramic stack 32 are selected to minimize compliance of the stack for maximum efficiency. All of the material properties, sizes, shapes, weights, etc., as well as the overall transducer design, are carefully selected to act in combination to match the impedance of the load (i.e. metal structural frameworks such as 15) to which the transducer assembly will be applied in operation. While piezoceramic transducer elements have been described as being preferred, it is believed obvious to those skilled in the art that other piezoelectric materials may be used in their place and mounted upon a tuned, horn-shaped or cylindrical transmit/receive head of hardened metal alloy such as that shown at 12 in FIG. 2.

An alternate embodiment of a clamping device that provides the ability to clamp the transducer to a beam using only one hand is shown in FIG. 3. The device consists of a C-type clamp with upper jaw 41 and lower jaw 42 that are moved towards each other by repeatedly squeezing on an advancing lever 43 in the direction of the handle 44. Both the handle 44 and the advancing lever 43 are sized appropriately to fit the palm of a human hand. The clamp operates as follows: As the operator squeezes on the advancing lever 43 it rotates about a pin 45 thereby providing a high degree of mechanical force advantage to move an advancing plate 46 in the forward direction, i.e. toward the lower jaw 42. The advancing plate 46 fits loosely around a shaft 47 such that as it is pushed forward by the advancing lever 43 it will cock slightly until it engages or grabs the shaft 47 whereby further forward motion of the advancing plate 46 results in forward motion of both the advancing plate 46 and the shaft 47. Upon release of the advancing lever 43 by the operator, a return spring 48 forces the advancing plate 46 and the advancing lever 43 back to its original (relaxed) position for the beginning or another cycle, if desired.

In the relaxed position, the advancing plate 46 is perpendicular to the shaft 48 which allows the shaft 48 to move freely through a loose fitting hole in the advancing plate 46. To prevent this free movement while in the relaxed position, or between cycles, a thumb release plate 49 is also mounted on the shaft 48. The thumb release plate 49 is held slightly cocked towards the rear by a locking spring 50. The thumb release plate 49 prevents rearward motion of the shaft 48, unless the thumb release plate 49 is depressed, thereby making it perpendicular to the shaft 48. The shaft 48 passes through guide blocks 51 that maintain proper alignment of the shaft 48. The rear of the shaft 48 is attached to the upper jaws 41 of the clamp thereby causing them to move in unison. To ensure that the clamp will lock in position with the desired amount of force, flexural disc springs 52 are mounted on the rear portion of the shaft, secured by a simple threaded nut and washer. The horn 53 and the reflector 54 are secured to a frame member of a ship as shown in FIG. 1 and perform the identical function as described previously with regard to FIGS. 1 and 2 of the drawings.

INDUSTRIAL APPLICABILITY

The acoustic transducer 11 according to the invention is mounted by a clamping device such as 16, 17 and 18. The clamping force required to secure the transducer transmit/receive head effectively and readily is provided by a manually operated compression screw 25 having a T-shaped handle 27. The transmit/receive transducer head member 12 in this embodiment is formed by a tuned, horn-shaped member 12 of hardened metal alloy such as stainless steel designed to match the mechanical impedance of the loads to be driven. A half wave length reflector 28 forms the underside of the clamping device 16, 17, 18. Acoustical vibrations are imparted to the metal framework of a ship or other building structure by positioning the acoustic transducer over a portion of a web in a structural beam such as 15 and the lead screw 27 tightened. Thus, ready, quick and effective securement of the acoustic transducer to the frame member to be excited with acoustic signal is quickly achieved in only a short period of time measured in seconds. Due to the small surface area at the tip 14 of the horn-shaped transmit/receive drive member 12, the clamping force is sufficient to cause the material of the frame member 15 under the tip of the hardened metal member 12 to be compressed to or near its yield point. This effectively couples the transducer to the framework for transmission and/or reception of acoustic signals "squeezing out" any coating or surface irregularities. The transducer has its tuned, horn-shaped, pointed end transmit/receive drive member 12 matched to the mechanical impedance of the load and in conjunction with the use of the half wave length reflecting waveguide 28, assures maximum transfer of the energy of the piezoelectric drive element into the frame member. This is achieved with a design that requires only minimum sized piezoceramic elements, weight and power sources and thus results in a highly portable, readily used and effective portable acoustic transducer for shipboard communication purposes, for shore communication purposes in buildings employing structural members, and in submerged structures and vessels.

Having described two embodiments of a novel acoustic transducer according to the invention, other modifications and variations of the invention will be suggested to those skilled in the art in the light of the above teachings. It is therefore to be understood that changes may be made in the particular embodiment of the invention described which are within the full intended scope of the invention as defined by the appended claims.

What is claimed is:

1. An acoustic transducer for sending and/or receiving acoustic communication signals through the structural framework of a ship or other building structure comprising portable, lightweight, quick, within a period measured in seconds, connect/disconnect mounting means for physically supporting the acoustic transducer on the framework of a ship of other building structure in a rapid, within a few seconds, easily executed with only a few hand movements and no special tools and effective manner;

said transducer including a transmit/receive head that is directly coupled to the load comprised by the framework of a ship or other building structure with said transmit/receive head comprising a tuned, shaped member of a hardened metal or metal alloy terminating in a pointed tip end of small surface area, said transmit/receive head being designed to match the mechanical impedance of the load; and said mounting means including means for readily with only a few hand movements and no special tools applying a compressive force to the tip end of the tuned, shaped transmit/receive head member sufficient to break through surface paint and/or other surface coatings on the framework of a ship or other building structure to which the transducer is mounted.

2. An acoustic transducer according to claim 1 wherein the compressive force applied by the tip end of the end of the tuned, shaped transmit/receive head member is sufficiently great so that the base metal of the material of the framework of the ship or other building structure just under the tip is compressed to or slightly beyond its yield point.

3. An acoustic transducer according to claim 1 further including reflecting wave guide means supported on said mounting means and engaging the framework of a ship or other building structure on the opposite surface thereof from the point contact of the pointed tip end of said tuned, shaped transmit/receive head member.

4. An acoustic transducer according to claim 2 further including reflecting wave guide means supported on said mounting means and engaging the framework of a ship or other building structure on the opposite surface thereof from the point contact of the pointed tip end of said tuned, shaped transmit/receive head member.

5. An acoustic transducer according to claim 1 wherein the quick connect/disconnect mounting means comprises a clamp, and wherein said transducer further includes a separate housing for a stack of piezoelectric drive elements with the piezoelectric drive element housing being supported on a movable platform movably mounted between the jaws of the clamp and having the tuned, shaped transmit/receive head member projecting from the bottom of the housing through the movable platform so as to be able to have its pointed tip end engage the surface of the framework of a ship or other building upon the clamp being slipped over the edge of the framework.

6. An acoustic transducer according to claim 5 wherein the transducer is comprised by a stack of piezoceramic elements secured within the separate housing which is mounted over and has the tuned, shaped transmit/receive head member projecting from the bottom thereof with the piezoceramic elements contacting and driving/driven by said head member, said head assembly of piezoceramic elements and tuned, shaped, pointed tip head member being held together in assembled relation by a separate threaded stress bolt for adjusting the initial mechanical stress impressed on the piezoceramic elements in a quiescent condition.

7. An acoustic transducer according to claim 6 further including compressive force producing means mounted on said mounting means and comprised by an axially movable threaded stud compression force producing member threadably received in one of the legs of the C-shaped clamp member with the free end of the stud engaging and acting through a reinforced top of the piezoceramic drive elements housing and movable platform that supports the transducer in place on the C-shaped clamp to move the tip point of the transmit/receive head member axially toward or away from the remaining opposite leg of the C-shaped clamp and hence toward or away from the framework of a ship or other building supported within the space between the tip point of the head member and the remaining opposite leg of the C-shaped clamp.

8. An acoustic transducer according to claim 7 further including reflective waveguide means mounted on the remaining opposite leg of the C-shaped clamp and contacting the surface of the framework of the ship or other building structure on the side thereof opposite from the point of contact of the tuned, shaped transmit/receive head member.

9. An acoustic transducer according to claim 8 wherein the reflective waveguide means mounted on the remaining opposite leg of the C-shaped clamp comprises an elongated stud having a pointed end which contacts the framework of the ship or other building structure and which is similar in configuration to the pointed tip end of the transmit/receive head member; the axial length of the stud being substantially equal to one-half the wavelength of the operating frequency of the acoustic transducer.

10. An acoustic transducer according to claim 9 wherein the compressive force applied by the tip end of the end of the tuned, shaped transmit/receive head member is sufficiently great so that the base metal of the material of the framework of the ship or other building structure just under the tip is compressed to or slightly beyond its yield point.

11. An acoustic transducer according to claim 1 wherein the quick connect/disconnect mounting means comprises a clamp, and wherein said transducer further includes a separate housing for an electro-mechanical transducer drive means supported between the jaws of the clamp and having the tuned, shaped transmit/receive head member projecting from the bottom of the electro-mechanical transducer drive means housing so as to be able to have its pointed tip end engage the surface of the framework of a ship or other building upon the clamp being slipped over the edge of the framework.

12. An acoustic transducer according to claim 11 wherein the electro-mechanical transducer drive mans is comprised by a stack of piezoceramic elements secured within the separate housing which is mounted over and has the tuned, shaped transmit/receive head member projecting from the bottom thereof with the piezoceramic elements contacting and driving/driven by said head member, said head assembly of piezoceramic elements and tuned, shaped, pointed tip head member being held together in assembled relation by a separate threaded stress bolt for adjusting the initial mechanical stress impressed on the piezoceramic elements in a quiescent condition.

* * * * *